United States Patent [19]
Thibault et al.

[11] Patent Number: 5,275,834
[45] Date of Patent: Jan. 4, 1994

[54] PLANT-WALL-RICH PRODUCT WITH ENHANCED WATER-SOLUBLE POLYSACCHARIDE FRACTION, METHOD OF MAKING SAME

[75] Inventors: Jean F. Thibault, Orvault; Guy Della Valle; Marie-Christine Ralet, both of Nantes, all of France

[73] Assignee: Institut National de la Recherche Agronomique, Paris, France

[21] Appl. No.: 656,178

[22] PCT Filed: Sep. 1, 1989

[86] PCT No.: PCT/FR89/00439
§ 371 Date: Mar. 5, 1991
§ 102(e) Date: Mar. 5, 1991

[87] PCT Pub. No.: WO90/04333
PCT Pub. Date: May 3, 1990

Related U.S. Application Data

[63] Continuation of Ser. No. 401,912, Sep. 1, 1989, Pat. No. 5,099,009.

[30] Foreign Application Priority Data

Sep. 5, 1988 [FR] France ............... 89 00386

[51] Int. Cl.$^5$ ............... A23L 1/05; A23N 1/02
[52] U.S. Cl. ............... 426/577; 99/510; 99/511; 99/513; 99/521; 424/195.1; 426/590; 426/804; 536/2; 536/128
[58] Field of Search ............... 424/195.1; 536/128, 536/2; 426/804, 577, 590; 99/510, 511, 513, 521

[56] References Cited

U.S. PATENT DOCUMENTS

| | | | |
|---|---|---|---|
| 3,948,677 | 4/1976 | Huster | 127/66 |
| 4,034,664 | 7/1977 | Hassell | 99/511 |
| 4,139,647 | 2/1979 | Douglas | 426/482 |
| 4,506,601 | 3/1985 | Ramirez | 99/511 |
| 4,526,794 | 7/1985 | Altomare | 426/258 |
| 4,528,188 | 7/1985 | Mitsuhashi | 424/116 |
| 4,529,613 | 7/1985 | Mezzino | 426/590 |
| 4,865,863 | 9/1989 | Prosise | 426/518 |
| 4,968,694 | 11/1990 | Madsen | 514/23 |
| 4,988,530 | 1/1991 | Hoersten | 426/577 |
| 5,008,254 | 4/1991 | Weibel | 514/57 |
| 5,011,701 | 4/1991 | Baer | 426/573 |

Primary Examiner—Michael G. Wityshyn
Assistant Examiner—Ralph Gitomer
Attorney, Agent, or Firm—Jacobson, Price, Holman & Stern

[57] ABSTRACT

The starting product is rich in broken-down plant cell walls. Water is added, if necessary, to obtain a mixture suitable for the subsequent shearing treatment. The product is subjected to a shearing stress before extrusion, to obtain product containing a water-soluble polysaccharide fraction greater than that which exists in nature, without changing the overall chemical composition. The modified product is obtained in the form of crushable aggregates. If the starting product is derived from higher plants naturally rich in pectins, the latter (which have a dry matter content of at least 70%) are extracted from the water-soluble fraction by precipitation by an alcohol or by its multivalent salts. The extraction residue consists of edible fibres.

18 Claims, 1 Drawing Sheet

PLANT-WALL-RICH PRODUCT WITH ENHANCED WATER-SOLUBLE POLYSACCHARIDE FRACTION, METHOD OF MAKING SAME

This application is a continuation of application Ser. No. 401,912, filed Sep. 1, 1989, now U.S. Pat. No. 5,099,009.

The present invention relates to plant wall-rich products and concerns more particularly a treatment of a novel type which is applied thereto and which results in products modified by an exclusively physical route. These modified products, which are novel in themselves, can be used as alimentary fibers. They can, however, be subjected directly to an aqueous extraction which also produces novel products consisting, on the one hand, of the water-soluble fractions and, on the other hand, of the extraction residues. The latter also constitute alimentary fibers. As for the water-soluble fractions, their nature varies depending on the starting products. It is possible to isolate from them substances of interest which are especially pectins, carrageenans, alginates, agaroses, agar, and the like, these substances finding an application, by virtue of their thickening and gelling properties, in the manufacture of fruit preserves, of candy, and in the preparation of cooked dishes and of dairy desserts. In accordance with the invention, as indicated above, these substances exhibit novel characteristics which render them more particularly applicable in certain cases, as will be described hereinafter.

The plant wall-rich products consist generally of the by-products of the food industry and of agriculture, which are obtained in enormous tonnages. They consist essentially of polysaccharides: pectins, hemicellulose and cellulose, which have functional and/or nutritional properties, employed by the industry. Thus, these products are sources of animal feedstuffs, of fermentable products, of alimentary fibers, soluble or otherwise, with recognized or potential nutritional effects, of polysaccharides (pectins) capable of being employed industrially as food additives, as mentioned above. The present invention also includes within its scope the upgrading of these products.

The treatments which are applied to them at the present time are essentially of chemical nature, being supplemented by conventional physical processes: liquid/solid separation, grinding, and the like.

By way of example, the extraction of pectins from the by-products of the fruit juice industry (apple marcs, citrus peelings) is in principle carried out hot (60°–80° C.) using an inorganic acid at pH 1–2.5, for periods which can be up to several hours. The yield is generally from 8 to 10% by weight of pectins relative to the initial solid content. The solution containing the pectins is separated from the residue by centrifuging and/or filtration techniques. This solution is next neutralized, is concentrated, and the pectins are precipitated from an alcoholic medium and recovered as a powder, ready for use.

A first disadvantage of this process is that an acidic treatment frequently causes contamination and corrosion of the vessels, with the additional disadvantage that the residues cannot be utilized, except as animal feedstuffs. Now, it is known that the residues from the extraction of pectins, or even the initial products, are potentially alimentary fibers, which are useful from a nutritional standpoint.

In addition, insofar as pectins are involved, it is known that the latter must be highly methylated (in other words must have a degree of methylation DM of more than 50%) and must have a sufficient molecular mass, so that they will be able to gel in the presence of sugar and in an acidic medium. If it is wished to obtain pectins with lower degrees of methylation, which will gel in the presence of $Ca^{2+}$ ions, in the presence or otherwise of sugar, a demethylation of the already extracted pectins must then be carried out in an acidic and alcoholic medium. The residue from the extraction of pectins, in its turn, forms a by-product intended for animal feedstuffs. It appears, however, that at present it is not possible to obtain pectins which have DM values of more than 75%. Such pectins, could be found useful in certain applications; it is known, in fact, that the higher the DM, the higher the rate of gelling, and the lesser the need for the pH to be low for gelling to occur. Thus, such pectins would be especially applicable in a novel way to products which call for ultrarapid gelling and to the gelling of weakly acidic sweet products.

Furthermore, as just indicated, the plant wall-rich products are sources of alimentary fibers. A renewal of interest in alimentary fibers has led the agricultural and food industry and the pharmaceutical industry to propose fiber-enriched products intended to be incorporated in products for alimentary or medical use. Alimentary fibers consist chiefly of cellulose, hemicellulose, pectic substances and lignin. It is thought that a deficiency of alimentary fibers could lie at the source of colic disorders (constipation, diverticulosis) or metabolic disorders (diabetes, hypercholesterolemia, biliary lithiasis, obesity). The fibers' ability to absorb water increases the hydration of stools, and this facilitates intestinal transport. Fiber-rich diets increase fecal calorie losses and enable a greater intestinal bulk to be obtained, with a reduced calorie intake.

At the present time, the production of alimentary fibers is carried out using techniques, such as physical fractionations, in the case of wheat bran, or using grinding/washing operations in an aqueous alcoholic medium in the case of the fibers obtained from fruit or vegetables. The fibers obtained have properties which are set by the nature of the starting products. Thus, they exhibit a low water-solubility. It would therefore be advantageous to obtain, from the same starting product, some fibers which could exhibit a superior water-solubility and whose solubility, and consequently degradability, could also be regulated so as to make it possible to have available products having a soluble fibers/insoluble fibers ratio adapted to the nutritional requirements on each occasion, the role of the insoluble fibers in digestive transport being predominantly directly mechanical, in comparison with the soluble fibers, whose role would appear to be predominantly metabolic. In the same way, it would be advantageous to be able to regulate the water absorption/retention properties of these fibers, insofar as they are also capable of being employed as filling components intended to provide no calorie input.

The present invention proposes novel products which meet the requirements recalled above, these novel products being obtained by a novel process no longer exhibiting any of the disadvantages of the prior art. Thus, the invention proposes, firstly, plant wall-rich products modified to exhibit an increased water-soluble fraction content; these modified products forming advantageous soluble fibers/insoluble fibers combinations, which cannot be obtained by the traditional acidic treatment which separates the two fractions.

The invention proposes even a solution in order to vary the ratio of the soluble fibers to the insoluble fibers of these modified products in a controlled manner. The process for obtaining these modified products has the advantage of resulting directly in such products, without the need for drying them, this product presenting, furthermore, no chemical corrosion or contamination problem, since the treatment with the acid is eliminated. In addition, since the modification of the starting products is exclusively physical and not chemical or biotechnological, the products obtained can be referred to as natural, which also represents an advantage from the viewpoint of dietetics and legislation.

Furthermore, an aqueous extraction carried out on these modified products produces an extract rich in soluble polysaccharides (pectins, carrageenans, alginates, and the like), which can be obtained directly by precipitation with traditional agents, such as alcohols like ethanol or isopropanol, or by means of multivalent salts such as aluminum salts, in other words without resorting to the neutralization stage of the traditional process. Moreover, according to the invention, pectins which have a very high degree of methylation, never obtained hitherto, are obtained.

The aqueous extraction also produces residues which can be employed as alimentary fibers, with a generally increased water absorption capacity.

The subject of the present invention is therefore firstly a plant wall-rich product modified to contain a water-soluble polysaccharide fraction which is higher than that existing naturally, without alteration of the overall chemical composition of the said product. In particular, the invention relates to a modified product, such as just defined, whose water-soluble polysaccharide fraction content is at least equal to twice this content in the natural product.

This modified product can originate from higher plants which are naturally rich in pectins, such as apple marcs, citrus peelings and beet pulps, potato pulp, shells, such as sunflower shells, or oil works residues. It can take the form of small-sized aggregates, such as tablets, granules and the like, or else a pulverulent form. Its water content is generally less than 12% by weight on a wet basis.

Another subject of the present invention is a process for the manufacture of the product, such as defined above, in which there is employed a plant wall-rich starting product in the divided state, water is added (if necessary) to the said product in the divided state, to obtain a mixture capable of undergoing the subsequent shearing treatment, and the product, to which water is optionally added, is subjected to a shearing force before extrusion, to obtain the required products in the form of small-sized aggregates which are, if appropriate, subjected to a grinding operation to obtain the required product in a pulverulent form.

Modified products are thus obtained, whose soluble part can be increased by a factor of as much as two to three, without the overall chemical composition having been altered. In some cases, these values can exceed those obtained with the corresponding acidic treatments of the prior art.

In addition, the modified products obtained have a lighter color than the initial products and require no drying, in view of their low water content after extrusion. They can be subjected to shaping, depending on the geometry of the die of the extrusion apparatus. They can also be ground after extrusion so as to obtain powders of specified particle size.

The water absorption capacity of these modified products is generally unchanged after the extrusion process, despite the high percentage of soluble product. In some cases, such as that of the apple, it is increased.

Furthermore, in the majority of cases it has been found that the quantity of water-soluble fraction which can be obtained increases linearly with the energy delivered to the product to produce the shearing, regardless of the temperature. This was not obvious and it allows the soluble fibers/insoluble fibers ratio of the modified products to be regulated.

A starting product which has a solids content of at least approximately 70% by weight on a wet basis is generally employed. Furthermore, most of the time, water will be added to the starting product, especially in a proportion of 10 to 30% by weight relative to the product as such, the quantity of water which is added being a function of the water content of the starting product and of the intensity of the treatment to be carried out.

This starting product is ground, if necessary, to have a particle size of the order of a millimeter, for example. A shear gradient which is generally between 100 and 800 $s^{-1}$ is applied, and this can be obtained by virtue of a twin-screw extruder, at a speed of rotation of between approximately 100 and 300 revolutions per minute.

Heat may be optionally introduced into the product in the shearing zone, in addition to that produced by the said shearing.

This shearing-extrusion process may be conducted in a conventional twin-screw extruder comprising a feed zone receiving, on the one hand, the starting product in the divided state and, on the other hand, water, the mixing and the transport taking place in a transport zone following the said feed zone, the transport zone itself being followed by a shearing zone, in which the screws advantageously have reverse flights and are provided with escapes enabling the material to pass through. The exit of the modified product then takes place via two dies of conventional configuration.

The present invention also relates to a process for the treatment of plant wall-rich products, wherein the abovementioned shearing-extrusion treatment is carried out and wherein the extruded product is subjected directly to an aqueous extraction making it possible to recover, on the one hand, an insoluble residue and, on the other hand, the solubilized polysaccharides. In the case of starting products which are rich in pectins, the pectins are isolated by precipitation using traditional techniques, especially from alcoholic medium.

These pectins have a degree of methylation which is higher than 75% and, in particular from 80 to 90%. In comparison with the pectins obtained by the traditional route (e.g., a hot extraction treatment of the by-products of the fruit juice industry with an inorganic acid at a pH of from 1–2.5), they can also be characterized by an increased content of arabinose, of the order of 50 to 100%.

As for the residues from aqueous extraction, these can be characterized by a water absorption capacity of more than approximately 20 g of water per gram of dry product.

The present invention also relates to the use, as alimentary fibers, in alimentary, pharmaceutical and dietetic industry, of the modified products, such as obtained by the shearing-extrusion process, and of the residues of aqueous extraction, such as defined above. The invention also relates to alimentary, pharmaceutical or dietetic compositions containing such fibers.

BRIEF DESCRIPTION OF THE DRAWINGS

To illustrate the process of the present invention better, a more detailed description will be given below, of an apparatus for carrying out the shearing-extrusion process of the invention, with reference to the attached drawing, in which

FIG. 1 of the attached drawing shows, diagrammatically, a twin-screw extruder which can be employed for carrying out the shearing-extrusion process of the invention. This extruder 1 comprises a cylindrical outer barrel 2, arranged horizontally. Arranged in an end region of the barrel 2 there is a feed hopper 3 for solid product, and a water entry indicated by reference 4. Arranged inside the barrel 2 there are two interpenetrating corotative screws 4a, 4b, which are intended to conduct the product-water mixture from the feed zone and via a central transport zone, to a shearing zone, in which the flights of the screws are reversed at 5a, 5b. These screw elements with reversed flights 5a, 5b are equipped with escapes 6a, 6b respectively, to allow the product to pass through. Downstream of the shearing zone, a zone 7 is set up, comprising two cylindrical dies 8a, 8b respectively. A possible heat input is, furthermore, indicated by reference 9.

Figure 1:
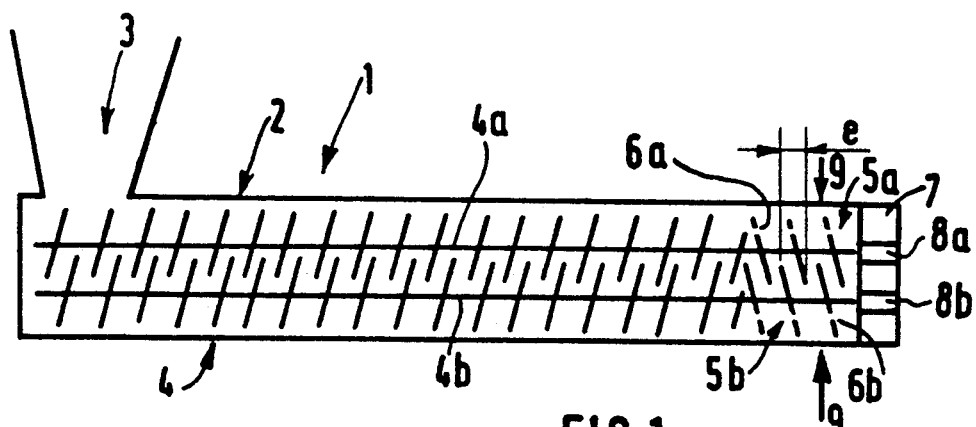
FIG. 1 is a diagrammatic view, in lengthwise axial section, of an extruder which can be employed according to the invention.
Figure 2:
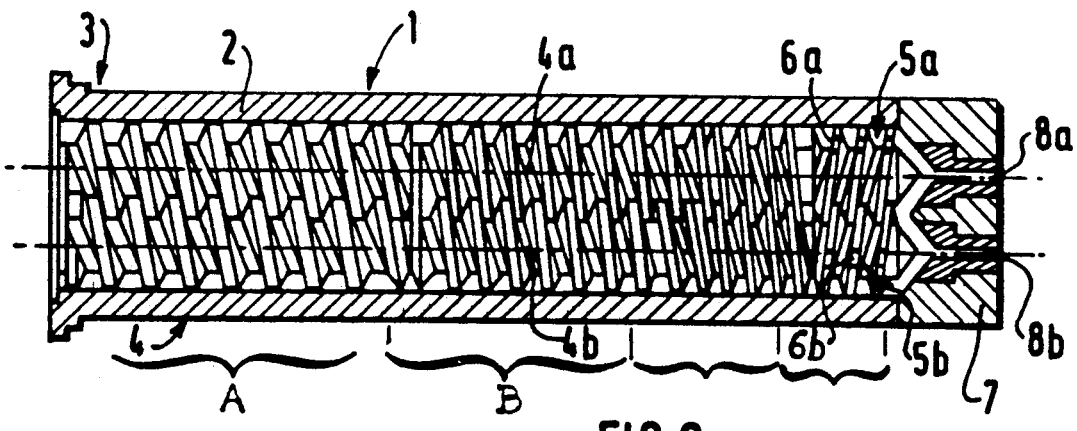
FIG. 2 is a diagrammatic view, partly in lengthwise axial section, partly in elevation, of another twin-screw extruder which can be employed in carrying out the invention.

The extruder of FIG. 2 differs from that of FIG. 1 in that it has successive feed (A) and transport (B and C) zones, with increasingly shallower flights.

Figure 3:
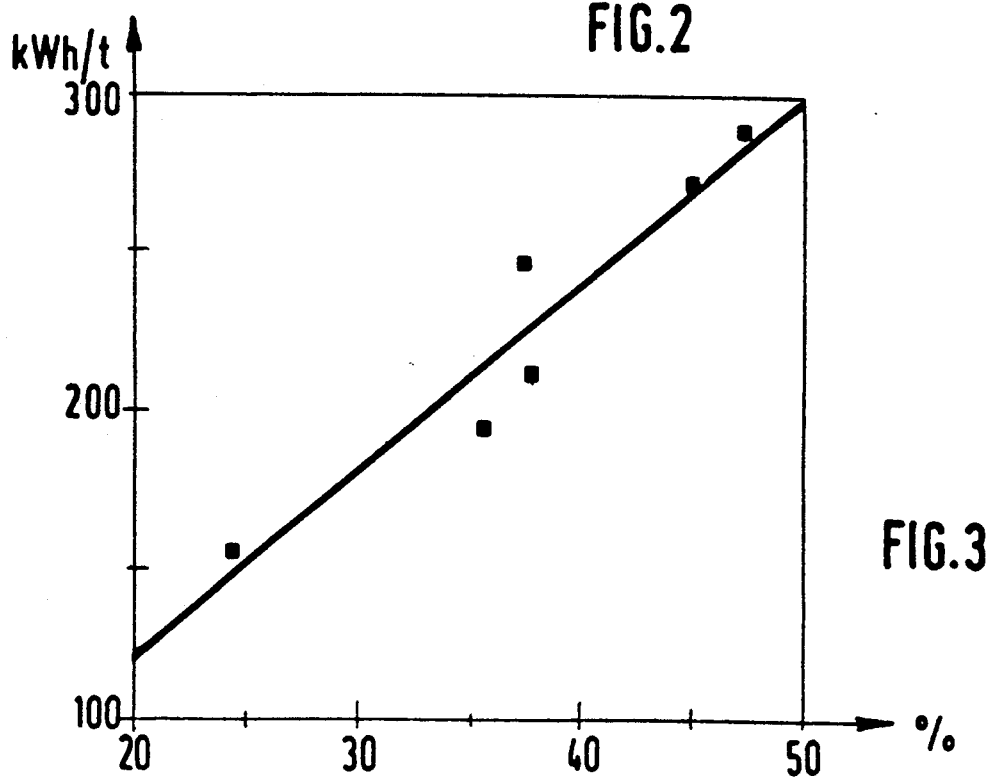
FIG. 3 is a diagram illustrating the results of the invention in a concrete example.

To illustrate the products of the present invention better, a number of embodiments thereof will be described in greater detail. Examples 1a to 1d to 2a to 2d and 3a to 3f are examples of the invention. FIG. 3 of the attached drawing is associated with Examples 3a to 3f. The following have been employed: for measuring water absorption, the method described in the paper entitled "Structure and Properties of Sugar Beet Fibres", C. Bertin, X. Rouau, and J. F. Thibault, J. Sci. Food Agric. (1988) Volume 44, pages 15-29; and for the characterization of the pectins (Table 4), the methods described in the paper entitled "Characterisation and Oxydative Crosslinking of Sugar Beet Pectines extracted from Cossettes and Pulps under different conditions", J. F. Thibault, Carbohydrate Polymers (1988) no. 8, pages 209-223.

REFERENCE EXAMPLE 1 and EXAMPLES 1a to 1d

Treatment of Apple Marcs

Apple marcs whose solids content is 89.3% by weight are employed. They are ground with the aid of a Rousselle hammer mill (linear velocity:100 m/s), fitted with a 2-mm grid. The product obtained is the product in accordance with Reference Example 1.

The shearing-extrusion treatment of the invention is then carried out, by adding to the product of Reference Example 1, each time, a quantity of water such as shown in Table 1, expressed as a percentage relative to the weight of the initial product as such, and then by conducting the actual treatment, certain parameters also being varied as shown in Table 1, in a Clextral BC45 cooker-extruder apparatus of a type of that described with reference to FIG. 2 with the following main characteristics:

The total length of the barrel 2 is approximately 1 meter, the interaxial distance between the two screws 4a and 4b 45 mm, and the cylindrical dies 8a, 8b have a radius of 2 mm and a length of 30 mm. The gap e between the screws is 1 mm or less.

The temperature shown in Table 1 is that of the barrel 2 before the die zone 7, and the number of revolutions per minute refers to the speed of rotation of the screws (4a, 4b), expressing the filling rate of the latter at a constant throughput. The intensities of the treatments in accordance with Examples 1a to 1d were evaluated by measuring the mechanical energy supplied by the main motor (E, expressed in kW h/t).

The following were then measured, in the case of the product of Reference Example 1 and those of Examples 1a to 1d:
 the percentage of water-insoluble matter;
 the percentage of water-soluble matter; and
 water absorption.

An aqueous extraction was conducted in a conventional manner by employing one gram of extruded product in 3 times 100 ml of water. The separation is carried out by centrifuging.

Gel permeation chromatography (GPC) runs on Sepharose CL2B gel, carried out on the aqueous extract showed two populations: one of high molecular mass, consisting essentially of galacturonic acids and the other, of lower molecular mass, consisting chiefly of neutral oses. The pectins were then precipitated from the aqueous extract in an alcoholic medium (80% by volume of ethanol in the final mixture), and this makes it possible to remove at least partially the population of lower molecular mass. Table 1 also shows:
 the content of galacturonic acids (GAA) and the content of neutral oses (NO) of the initial product; and
 the percentage of the initial product which can be precipitated with 80% ethanol (Example 1b).

All the results obtained are shown in Table 1.

COMPARATIVE EXAMPLE 1

After the same starting product has been ground in the same way as in Example 1, a conventional pectin extraction treatment is carried out: 5 g of product extracted with three 150-ml portions of 0.05N HCl at 85° C. for 3×30 minutes. The measurements performed on this product were the same as in the case of Reference Example 1 and Examples 1a to 1d, the results being also shown in Table 1.

TABLE 1

| Example | Treatment after grinding | | | Water-insolubles (%) | Water-solubles | | | | Water absorption (ml/g) | |
|---|---|---|---|---|---|---|---|---|---|---|
| | | | | | (%) | % GAA | % NO | % precipitables | before aqueous extraction | after aqueous extraction* |
| Ref. 1 | None | | | 78.4 | 21.6 | 1.5 | 7.3 | | 8.1 | 9.5 |
| | Shearing-extrusion at 100° C. | | | | | | | | | |
| | % added water | Revolutions/ min | E (kW h/t) | | | | | | | |
| 1a | 20 | 150 | 156.9 | 63.5 | 36.5 | 5.4 | 10.9 | | 18.1 | 22.3 |
| 1b | 20 | 250 | 230.4 | 60 | 40 | 7.4 | 12.1 | 12.1 | 16.5 | 22.2 |
| 1c | 10 | 250 | 265.8 | 48.7 | 51.3 | 9.5 | 16.6 | | 13.1 | 22.3 |
| 1d | 30 | 250 | 175.6 | 66.9 | 33.1 | 5 | 10.1 | | 17.6 | 21.4 |
| Comp. 1 | Acidic extraction | | | 59.6 | 40.4 | 9.3 | 16.2 | 13.7 | 13.7 | |

*This parameter is discussed in Example 4

When Table 1 is examined, it is found that the water solubility of the products of Examples 1a to 1d is higher than that of the reference product 1. This solubility increases with an increase in the speed of rotation of the screws and with a decrease in the quantity of water which is added, in other words, with the increase in the mechanical energy supplied by the main motor of the extruder.

The acidic treatment of Comparative Example 1 enables approximately 40% of the weight of apple marcs to be solubilized. The shearing-extrusion treatment enables an equal solubilization to be obtained, or even to be exceeded (Example 1c).

The water absorption capacity of these products increases considerably (by about twice) after the shearing-extrusion treatment of the invention (without aqueous extraction).

The total GAA and NO composition shows that the soluble matter is enriched in polysaccharides, when compared with the reference product. These results are comparable with those obtained in the case of Comparative Example 1 (acidic extraction of the pectins), which shows the effectiveness of the shearing-extrusion treatment of the invention in increasing the water-soluble polysaccharide (or fiber) fraction.

Insofar as the fraction which can be precipitated is concerned, this is obtained in a 12% yield, which is comparable with the percentage obtained in the case of acidic extraction, also showing the effectiveness of the process of the invention.

The pectins, for which it was shown that they were obtained in yields similar to those of the acidic extraction, were studied in greater detail, their characteristics being shown in Table 4.

On examining Table 4 it is found that apple pectins obtained after shearing-extrusion have a higher molecular mass than those obtained by an acidic route. The pectins obtained according to the invention have higher contents of galacturonic acids and higher degrees of methylation and of acetylation than those obtained in the case of the acidic extraction.

It should be stressed that the degree of methylation obtained is very high, since it is about 90%. This value has never been obtained by acidic extraction because in a medium of this kind the ester functional groups can be hydrolyzed, and so the degrees of methylation are limited to 70%. This gives the apple pectins thus obtained gelling characteristics which differ from those obtained by an acidic route, because an increase in the degree of methylation shortens the gelling time and raises the pH of gelling. Thus, with the pectins of the invention it has not been possible to obtain true gels (homogeneous gels) in the conventional conditions for gelling highly methylated pectins (pH=2.4; 90° C.; 65% of sucrose), but rather pregels or heterogeneous gels, these phenomena being due to excessively fast gelling at this pH. When the pH is raised to 3, true gels are obtained with 1.8% concentrations of pectins of the invention.

REFERENCE EXAMPLE 2 and EXAMPLES 2a to 2d, COMPARATIVE EXAMPLE 2

Treatment of Citrus Peelings

The procedure was the same as in the case of apple marcs, and the results have been shown in the same way. The solids content of the initial products was 89.8% by weight.

The comments which can be given are the same as above, the acidic treatment solubilizing approximately 50% by weight of the citrus peelings, a value which is exceeded in the case of the shearing-extrusion treatment of the invention. Using the process of the invention, it is therefore possible to obtain treated citrus peelings in which the soluble part has been increased by a factor of two to three without the overall chemical composition being changed.

Insofar as the water absorption capacity is concerned, the results show that the values are not altered, and that they are even slightly increased after the shearing-extrusion treatment of the invention.

With regard to the percentage of substances which can be precipitated with 80% ethanol, it is found that pectins can be obtained in a yield of the order of 25%, a value equal to that obtained by acidic extraction.

If reference is now made to Table 4, it is found that the molecular mass is lower by a half than that of the product extracted by an acidic route and that the pectins obtained have higher contents of galacturonic acids and a degree of methylation and a degree of acetylation which are higher than those obtained in the case of the acidic extraction. This degree of methylation is also remarkable, since it is of the order of 85%. Gels were obtained in the same conditions as previously.

TABLE 2

| Example | Treatment after grinding | Water-insolubles (%) | Water-solubles | | | | Water absorption (ml/g) | |
|---|---|---|---|---|---|---|---|---|
| | | | (%) | % GAA | % NO | % precipitables | before aqueous extraction | after aqueous extraction* |
| Ref. 2 | None | 79.7 | 20.3 | 2.5 | 4.7 | | 14.5 | 27.2 |
| | Shearing extrusion at 100° C. | | | | | | | |

TABLE 2-continued

| Example | Treatment after grinding | | | Water-insolubles (%) | Water-solubles | | | | Water absorption (ml/g) | |
|---|---|---|---|---|---|---|---|---|---|---|
| | % added water | Revolutions/ min | E (kW h/t) | | (%) | % GAA | % NO | % precipi-tables | before aqueous extraction | after aqueous extraction* |
| 2a | 20 | 150 | 167 | 54.1 | 45.9 | 14.6 | 12.1 | | 15.4 | 28.8 |
| 2b | 20 | 250 | 227.2 | 54.1 | 45.9 | 17.9 | 11.8 | 24.7 | 18.3 | 28.7 |
| 2c | 10 | 250 | 300.5 | 40 | 60 | 22.4 | 12.6 | | 13.6 | 27.3 |
| 2d | 30 | 250 | 188.3 | 64.8 | 35.9 | 12.9 | 8.7 | | 15.8 | 22.3 |
| Comp. 2 | Acidic extraction | | | 49.6 | 50.4 | 22.9 | 13.2 | 24.8 | 15.9 | |

*This parameter is discussed in Example 4

REFERENCE EXAMPLE 3, EXAMPLES 3a to 3b and COMPARATIVE EXAMPLE 3

Treatment of Beet Pulps

TABLE 3

| Example | Treatment after grinding | | | | Water-insolubles (%) | Water-solubles | | | | Water absorption (ml/g) | |
|---|---|---|---|---|---|---|---|---|---|---|---|
| | | | | | | (%) | % GAA | % NO | % precipi-tables | before aqueous extraction | after aqueous extraction* |
| Ref. 3 | None | | | | 83.4 | 16.6 | 0.7 | 6.1 | | 19.3 | 24.7 |
| | Shearing-extrusion | | | | | | | | | | |
| | added water % | Temp (°C.) | Revolutions/ min | E (kW h/t) | | | | | | | |
| 3a | 20 | 100 | 150 | 211.2 | 62.1 | 37.9 | 11.4 | 10.4 | | 19.8 | 27.3 |
| 3b | 20 | 100 | 250 | 270.7 | 54.8 | 45.2 | 14.5 | 13.3 | 22.2 | 14.4 | 28.8 |
| 3c | 30 | 100 | 250 | 245.9 | 62.5 | 37.5 | 9.8 | 7.8 | | 18.9 | 26.2 |
| 3d | 30 | 100 | 150 | 154.6 | 75.6 | 24.4 | 4.8 | 6.4 | | 17.1 | 22.6 |
| 3e | 30 | 180 | 150 | 193.8 | 64.3 | 35.7 | 8.9 | 9.6 | | 18.7 | 26.1 |
| 3f | 20 | 180 | 250 | 287.3 | 52.5 | 47.5 | 13 | 15.1 | | 13.4 | 21.9 |
| Comp. 3 | Acidic extraction | | | | 50.5 | 49.5 | 10.9 | 14.7 | 18.6 | 28.8 | |

*This parameter is discussed in Example 4

TABLE 4

| Treatment of example | 1b + aqueous extraction | Comp. 1 | 2b + aqueous extraction | Comp. 2 | 3b + aqueous extraction | Comp. 3 |
|---|---|---|---|---|---|---|
| Intrinsic viscosity (ml/g) | 240 | 166 | 220 | 546 | 110 | 310 |
| Molecular mass | 44 900 | 34 000 | 42 100 | 82 900 | 25 100 | 54 400 |
| Degree of methylation | 90 | 74.1 | 84.9 | 72.1 | 78.5 | 75.4 |
| Degree of acetylation | 7.1 | 6 | 4.7 | 2.2 | 39.1 | 30.7 |
| Content of galacturonic acids | 54.4 | 34.2 | 69.6 | 61.5 | 45.3 | 41.2 |
| Content of neutral oses of which: | 21.5 | 12.4 | 11.7 | 8.9 | 17.3 | 12.0 |
| rhamnose | 0.8 | 0.7 | 0.7 | 0.7 | 1.4 | 1.2 |
| arabinose | 6.5 | 3.8 | 5.6 | 5.0 | 10.5 | 4.9 |
| xylose | 0.7 | 0.8 | 0.7 | 0.1 | 0.2 | 0.1 |
| mannose | 0.3 | 0.0 | 0.7 | 0.0 | 0.2 | 0.1 |
| galactose | 2.6 | 4.1 | 2.8 | 2.4 | 2.8 | 2.8 |
| glucose | 10.7 | 3.4 | 1.3 | 0.6 | 2.3 | 2.9 |
| Ferulic acid | 1.0 | 0.9 | — | — | — | — |

The procedure was the same as above and the results have been shown in the same way. The solids content of the initial products was 90.6% by weight. The same comments as previously can be made. Furthermore, FIG. 4 shows the curve obtained by plotting the percentage of soluble fibers as the abscissae and the energy supplied by the main motor of the extruder as the ordinates, which shows a good correlation between these two values (correlation coefficient: 0.94).

Table 5 shows the carbohydrate composition (% solids content) of the starting products, of the residues of aqueous extraction performed on the extruded products, and of the products consisting of the residues of the conventional acidic extraction.

TABLE 5

| | | Ref 1 | 1a | 1b | 1d | | |
|---|---|---|---|---|---|---|---|
| Treatment of Example | Ref 1 | + aqueous extraction | | | | | Comp 1 |
| Rhamnose | 1 | 1.4 | 1.4 | 1.2 | 1.7 | 1.8 | 2.1 |
| Arabinose | 6 | 5.2 | 6.1 | 4.1 | 2.5 | 6 | 2 |
| Xylose | 3.5 | 3.1 | 5.1 | 4.7 | 7.6 | 5.1 | 8.3 |
| Mannose | 2 | 1.2 | 2.1 | 1.9 | 1.8 | 1.8 | 2.5 |
| Galactose | 4.3 | 4.2 | 6.1 | 5.1 | 3.8 | 5.6 | 5.4 |
| Glucose | 17 | 14.2 | 20.7 | 19.2 | 18.9 | 17 | 17 |
| Galacturonic acids | 13.8 | 13.7 | 13.1 | 10.9 | 5.5 | 12.6 | 11.8 |
| Total | 47.6 | 43 | 54.6 | 47.1 | 41.8 | 49.9 | 49.1 |
| | | Ref 2 | 2a | 2c | 2d | | |
| Treatment of Example | Ref 2 | + aqueous extraction | | | | | Comp 2 |
| Rhamnose | 1.5 | 1.7 | 2.1 | 1.9 | 1 | 1.4 | 2.8 |

TABLE 5-continued

| | | | | | | | |
|---|---|---|---|---|---|---|---|
| Arabinose | 7 | 8.6 | 7 | 7.3 | 2.4 | 8.1 | 2.3 |
| Xylose | 2.5 | 3.2 | 4.8 | 4.3 | 4.3 | 3.1 | 5.5 |
| Mannose | 2.9 | 2.8 | 3.8 | 3.4 | 3.2 | 2.7 | 4.3 |
| Galactose | 5.4 | 6.1 | 7.2 | 6.7 | 4.3 | 6.5 | 6.6 |
| Glucose | 12.4 | 10.3 | 15.7 | 13.4 | 15.7 | 11.5 | 17.9 |
| Galacturonic acids | 29.2 | 30.3 | 21.2 | 19.9 | 13 | 25 | 22.5 |
| Total | 60.9 | 63 | 61.8 | 56.9 | 43.9 | 58.3 | 61.9 |

| Treatment of Example | Ref 3 | Ref 3 | 3a | 3b | 3c | 3d | 3e | 3f | Comp 3 |
|---|---|---|---|---|---|---|---|---|---|
| | | + aqueous extraction | | | | | | | |
| Rhamnose | 1.7 | 0.8 | 0.9 | 0.9 | 1.3 | 1.6 | 0.8 | 0.8 | 2.4 |
| Arabinose | 10.7 | 9.8 | 8.9 | 8.4 | 7.4 | 8.9 | 8.3 | 7 | 6.3 |
| Xylose | 0.6 | 0.5 | 0.6 | 0.7 | 0.5 | 0.5 | 0.5 | 0.9 | 3 |
| Mannose | 0.9 | 0.6 | 0.7 | 0.8 | 0.7 | 0.6 | 0.5 | 0.7 | 2 |
| Galactose | 4.1 | 3.1 | 3.3 | 3.1 | 3.3 | 3.2 | 3 | 2.8 | 5.1 |
| Glucose | 26.4 | 14.4 | 21.6 | 23.2 | 22.2 | 18.1 | 17.3 | 25.5 | 15 |
| Galacturonic acids | 17.9 | 15.2 | 9 | 7.9 | 11 | 13.3 | 12.2 | 7.2 | 15.1 |
| Total | 62.3 | 44.4 | 45 | 45 | 46.4 | 46.2 | 42.6 | 44.9 | 48.9 |

The results show that apart from a depletion in galacturonic acids and a possible enrichment in glucose (originating from cellulose), these residues have overall compositions close to the initial products. Their total content of polysaccharides is generally as high as that of the initial products. Alimentary fibers can be obtained from these products after drying and grinding. Furthermore, the process significantly improves the color of the products obtained In Tables 1 to 3 the absorption properties have been shown each time for the apple, the citrus and the beet, respectively. The values obtained for these fibers are generally higher than those of the initial products, before or after extrusion, or than those of the residues from acidic extraction.

We claim:

1. A process for treating a plant-wall rich product which comprises:
   a) optionally adding water to the plant-wall rich product in a divided state in an amount effective to obtain material capable of undergoing a subsequent shearing treatment;
   b) subjecting the product, to which water has optionally been added, to a shearing force;
   c) extruding the product of step (b) to obtain a plant wall-rich product modified to contain a water-soluble polysaccharide fraction which is higher than that existing naturally, without alteration of the overall chemical composition of the plant-wall rich product; the modified product being in the form of small-sized aggregate;
   d) optionally grinding the small-sized aggregate to obtain the modified product in pulverulent form;
   e) subjecting the aggregate, optionally in pulverulent form, to aqueous extraction; and
   f) optionally recovering a water-soluble fraction and/or an extraction residue.

2. A process of claim 1 wherein the small-sized aggregate is in the form of a tablet or granule.

3. A process of claim 1 wherein the plant-wall rich product of step (a) has a solids content of at least 70% by weight on a wet basis.

4. A process of claim 1 wherein the plant-wall rich product of step (a) has a particle size in the order of magnitude of a millimeter.

5. A process of claim 1 which comprises adding water in step (a) in a proportion of from 10 to 30% by weight relative to the weight of the plant-wall rich product.

6. A process of claim 1 wherein step (b) comprises applying a shear gradient of from 100 to 800 $s^{-1}$.

7. A process of claim 1 which comprises recovering the water-soluble fraction and controlling the water-soluble fraction recovered by varying energy delivered to the product during shearing.

8. A process of claim 1 which comprises obtaining a modified product wherein the water-soluble polysaccharide fraction content is at least equal to 1.5 times that in the starting product of step (a).

9. A process of claim 8 wherein the water-soluble polysaccharide fraction content is at least twice that in the starting product of step (a).

10. A process of claim 1 wherein the modified product has a water content not exceeding 12% by weight on a wet basis.

11. A process of claim 1 wherein the plant-wall rich product of step (a) is that derived from higher plants naturally rich in pectins.

12. A process of claim 11 wherein the plant-wall rich product is apple marc, citrus peeling or beet pulp.

13. A process of claim 11 which comprises recovering the water-soluble fraction in step (f) and extracting pectins therefrom.

14. A process of claim 13 which comprises extracting the pectins directly from the water-soluble fraction by precipitating them with an alcohol or with a multivalent salt;

15. A process of claim 1 which comprises recovering the extraction residue, drying it and grinding it.

16. An extraction residue which is at least substantially the same as that obtained according to claim 1 and which has a water absorption capacity of more than approximately 20 grams of water per gram of dry product.

17. In the preparation of fiber-enriched products with a source of fiber, the improvement wherein the fiber source is at least substantially the same as the dried and ground extraction residue obtained by the process of claim 1.

18. An alimentary-fiber-containing composition wherein the alimentary fiber is at least substantially the same as that of the dried and ground extraction residue of claim 15.

* * * * *

UNITED STATES PATENT AND TRADEMARK OFFICE
CERTIFICATE OF CORRECTION

PATENT NO. : 5,275,834
DATED : January 4, 1994
INVENTOR(S) : THIBAULT et al.

It is certified that error appears in the above-identified patent and that said Letters Patent is hereby corrected as shown below:

On the title page, left column at [30], "Sep. 5, 1988 [FR] France ...... 89 00386" should read --Sep. 5, 1988 [FR] France ...... 89 00396--.

Signed and Sealed this

Eleventh Day of October, 1994

Attest:

BRUCE LEHMAN

*Attesting Officer*        *Commissioner of Patents and Trademarks*